June 2, 1970 P. M. FIELD ET AL 3,515,476
OVERHEAD PROJECTOR
Filed July 14, 1967 4 Sheets-Sheet 1
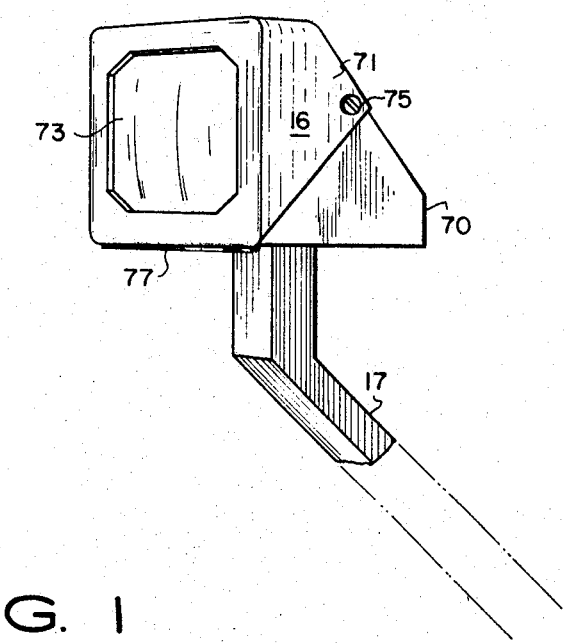
FIG. 1
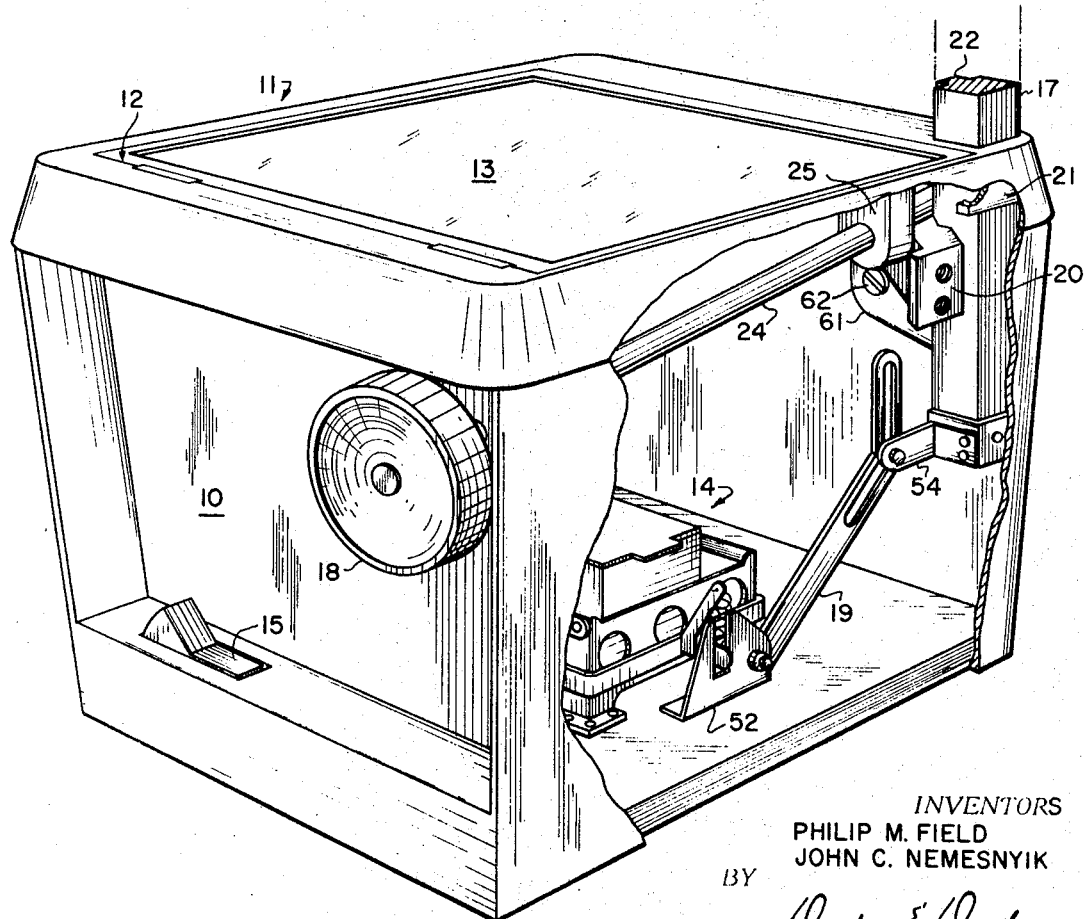
INVENTORS
PHILIP M. FIELD
JOHN C. NEMESNYIK
BY
Darby & Darby
ATTORNEYS June 2, 1970     P. M. FIELD ET AL     3,515,476

OVERHEAD PROJECTOR

Filed July 14, 1967     4 Sheets-Sheet 2

*INVENTORS*
PHILIP M. FIELD
JOHN C. NEMESNYIK

BY *Darby & Darby*

ATTORNEYS

June 2, 1970   P. M. FIELD ET AL   3,515,476
OVERHEAD PROJECTOR

Filed July 14, 1967   4 Sheets-Sheet 3

INVENTORS
PHILIP M. FIELD
JOHN C. NEMESNYIK
BY Darby & Darby
ATTORNEYS

June 2, 1970  P. M. FIELD ET AL  3,515,476
OVERHEAD PROJECTOR

Filed July 14, 1967  4 Sheets-Sheet 4

INVENTORS
PHILIP M. FIELD
JOHN C. NEMESNYIK
BY
Darby & Darby
ATTORNEYS ably or collapse as the head is tilted for elevating the image on the screen. To avoid this problem, a second sealed chamber is provided within the segmented head which is connected to the exterior bellows. The second chamber is positioned so that it has a volume change which is equal and opposite to that which occurs between the two lens housings, so that the volume within the sealed bellows remains constant as the two lens housings are pivoted relative to each other.

United States Patent Office

3,515,476
Patented June 2, 1970

3,515,476
OVERHEAD PROJECTOR
Philip M. Field, Maplewood, and John C. Nemesnyik, Nutley, N.J., assignors to Charles Beseler Company, East Orange, N.J., a partnership
Filed July 14, 1967, Ser. No. 653,400
Int. Cl. G03b 21/20
U.S. Cl. 353—87                                    9 Claims

ABSTRACT OF THE DISCLOSURE

An improved overhead projector provided with (1) a front focusing knob which repositions both the projection lamp and the projection head to maintain the proper optical distance relationship between the two when the projection head is repositioned for focusing the image on a screen, (2) a bellows-sealed segmented projection head having a second interior sealed chamber which compensates for the change in air volume in the projection head when one portion of the segmented head is pivoted relative to the other, (3) a pivoted lamp holder which facilitates removal of inoperative lamps and reinsertion of replacement lamps, and (4) a projection stage latch assembly operative from the focusing knob to open the top of the projector.

THE INVENTION

This invention relates to optical projectors and more particularly to construction of an improved overhead projector.

An overhead projector is a visual demonstration apparatus used to project an image from a transparency onto a screen for viewing. It conventionally consists of two basic components, the projector body and the projection head which is movably mounted above the body on a projection head post. The body houses a lamp and a condensing lens (usually a plastic Fresnel lens) which combine to produce an upwardly directed cone of light through a transparency stage which supports the transparency being projected. The projection head is movably positioned by the post above the body while remaining on the optical axis of the lamp and condensing lens, and on the axis of the upwardly directed cone of light produced thereby. The head houses the objective lens system and mirror which focus and reflect the projected image to a generally vertically disposed screen. The height of the head above the body is variable in order to permit focusing of the image on the screen for different projection distances.

The projection head also usually includes means for elevating the image on the screen. These elevating means take several forms. One arrangement is the "segmented" type projection head which is shown in copending application Ser. No. 340,473, filed Jan. 27, 1964, by Philip M. Field who is one of the joint inventors here. This segmented head comprises: (1) a first generally horizontal lens element, (2) a mirror which is pivotally positioned on the optical axis of the first lens so as to reflect the incident cone of light from the first lens to a generally horizontal reflected optical axis, (3) a second generally vertical lens element which is also pivotally mounted and positioned on the reflected optical axis, and (4) an angle-halving linkage connecting these three elements so as to cause the mirror to move one-half the angle of the movement of the second lens element thereby maintaining the coaxial alignment of the incident and reflected ray with the first and second lens elements respectively. The first lens element is fixed in a housing which is mounted to the projection head post, and the second lens is mounted in a second lens housing which is pivotally supported from the first lens housing. The mirror and angle-halving linkage are coupled within these two housings. Reference is made to the aforementioned copending Field application for further details of construction and operation of this type of segmented head.

Other conventional means for elevating the image on the screen include the unitary type projection head where the lenses and mirror are fixed relative to each other in the same orientation as described above, and consequently move as a unit for elevating the image on the screen. This arrangement is illustrated in Pat. No. 3,126,786. Other projection head arrangements include those where all of the objective lens elements are positioned either before or after the mirror and the mirror moves independently of these lens elements, and where the lens elements are positioned between the mirror and the screen and move in a preselected relationship with the mirror as the mirror is tilted for elevation of the image.

In all of these projection heads it is important that the lamp be positioned so that the image of the lamp filament is located at the optimum position in the projection head. This point is usually near the center of the lens system, its precise location depending upon the particular design of the projection lens and mirror system, the required range of projection distances and elevations, and other such factors. The unitary head referred to above presents still another problem in this respect, because as the first lens element pivots to elevate the image, it tends to vignette a portion of the incoming light.

It will thus be obvious to those skilled in the art that the point where the lamp filament focuses in the projection head must be carefully selected to provide optimum projection quality. Once this point is selected, it will also be apparent that as the projection head moves up and down relative to the projector body for focusing, this point will move relative to the projection head unless means are provided for changing the position of the lamp. One arrangement for accomplishing this is disclosed in Field Pat. 3,244,069.

An object of this invention is to provide another improved arrangement, which is much simpler and more effective than that shown in the aforementioned Field patent. In this new arrangement the lihgt source is caused to move up and down with the head to maintain the desired location of the lamp filament image within the projection head. To do this, the projection head and post move up and down as a unit for focusing. Associated with the lower end of the post is a cam arrangement which is connected through linkages to the lamp housing. As the head and post are repositioned for focusing, the lamp housing is also repositioned by this cam linkage so as to maintain the image of the lamp filament in the optimum relationship to the projection head.

Another object of this invention relates to the construction of the segmented type projection head. The segmented head is advantageous over certain other heads, because it maintains a coaxial ray relationship of the incident and reflected ray with the lens elements on opposite sides of the mirror, as described above. As a result, aberrations resulting from off axis refraction are minimized. The segmented head does, however, have a disadvantage in that dust gets into the head and settles on the interior surfaces of the lenses and on the reflective surface of the mirror. It is desirable to prevent this. The improved head disclosed herein avoids this problem by preventing the entry and deposit of dust on the mirror and interior lens surfaces. This is accomplished by sealing the lens carrying portions of the two lens housings with an exterior bellows. It will be apparent that as the two lens housings are pivoted relative to each other in order to elevate the image, the volume enclosed by the housings will vary. Consequently the volume change must be compensated for or else the bellows sealing the two lens housings will puff out or collapse inwardly, causing premature fatigue failure of the bellows or relative movement of the two housings unless some volume change compensating means is provided. One method disclosed herein is to seal the head except for one opening in the back of the head which has a dust filter, the filter allowing air to enter and leave the head but preventing the entry of objectionable dust. Another new method is to permit the air to enter, but to provide means for maintaining a balanced pressure. Such an arrangement includes such a compensating means in the form of a bag-like lung or chamber disposed within the head behind the mirror which communicates with the outside air through an opening in the back of the head. Since this chamber is positioned behind the mirror, it will not interfere with the incident or reflected image passing through the head. As the two lens housings are pivoted relative to each other for elevating the image on the screen, the head volume changes and the interior chamber expands or contracts accordingly. The pressure on each side of the exterior bellows remains unchanged, since the volume change is compensated for completely by the interior chamber. No dust can enter into the space between the lenses and the mirror, because this space is effectively sealed between the interior chamber and exterior bellows.

Another object of this invention is to provide a means permitting easy replacement of burned out lamps in the projector by the operator. These projectors are widely used by teachers in classrooms. When a lamp burns out, it is important that the teacher be able to quickly and easily replace the lamp with a new one. Otherwise, classroom attention is lost and the teacher is required to either cover the same material again or to dispense with the use of projector until time allows for replacement of the lamp. These projectors use high wattage lamps of very small size, which are usually made with pin type contacts. Because of the high wattage, good contact pressure is required between the pins and the contacts in the socket. This requires a great force to insert and remove the lamps. Furthermore, the lamps usually are positioned in a deep lamp housing to shield the body of the projector from radiant heat, making the socket difficult to reach. Thus a simplified method of removing a burned out lamp and replacing it with a new one is most desirable. Lamp replacement is simplified in the projector disclosed herein by two related features. In order to replace the lamp the first step is to open the top of the projector, and this is done in the projector disclosed herein by manipulation of the projection head focusing knob, which unlocks a latch mechanism and opens the projector. The top of the projector opens by pivoting the projection stage assembly upwardly about one side of the projector top assembly. Once the top is opened, the second lamp replacement simplifying feature is apparent. The lamp is mounted on a pivotal yoke, which has a handle that can be easily manipulated by the teacher. The teacher need only flip the yoke upwardly. This removes the burned out lamp from its socket and raises it upwardly away from the heat of the lamp housing to a convenient position for removal from the yoke and replacement with a new lamp. The teacher then flips the yoke down, causing the lamp to plug into its socket and be properly positioned relative to the condensing lens and transparency stage. The projection stage assembly is then locked into the closed position by a sliding back latch mechanism which is tripped by manipulation of the same focusing knob.

Another object of this invention is to provide a projector having a front focusing knob arrangement. This refers to the locating of the focusing mechanism in the body of the projector toward the front (in the direction of projection) of the projector. In order to appreciate the advantages of this arrangement, brief reference should be made to transparency roll attachments. These projectors are frequently used with transparency film on top of the transparency stage that unreels from the feed roll of a transparency roll attachment, and as the film is used, it is reeled onto the take-up roll. The transparent film is thus one continuous roll which unreels from a feed roll attached to one side of the projector, then across the top of the transparency stage where it is used, and finally onto the take-up reel on the other side of the projector where the used film is stored. It is advantageous to permit this film to be mounted either in a side to side feed arrangement, or in a front to back feed arrangement. It is also advantageous to have the focusing knob in the front part of the projector body for convenient focusing manipulation by the user. To accomplish this, the focusing knob is positioned in the front of the projector body, below and inwardly from the projector top assembly, so as not to interfere with the placement and operation of transparency film roll attachment in the front to back film feed arrangement.

These and other objects and advantages will become apparent from the following description taken with the accompanying drawings. It will be understood, however, that the drawings are for purposes of illustration only and are not to be construed as defining the scope or limits of the invention, reference being had for the latter purpose to the claims which follow.

In the drawings:

FIG. 1 is an isometric view, with parts broken away, of an overhead projector made in accordance with this invention;

Figure 2:
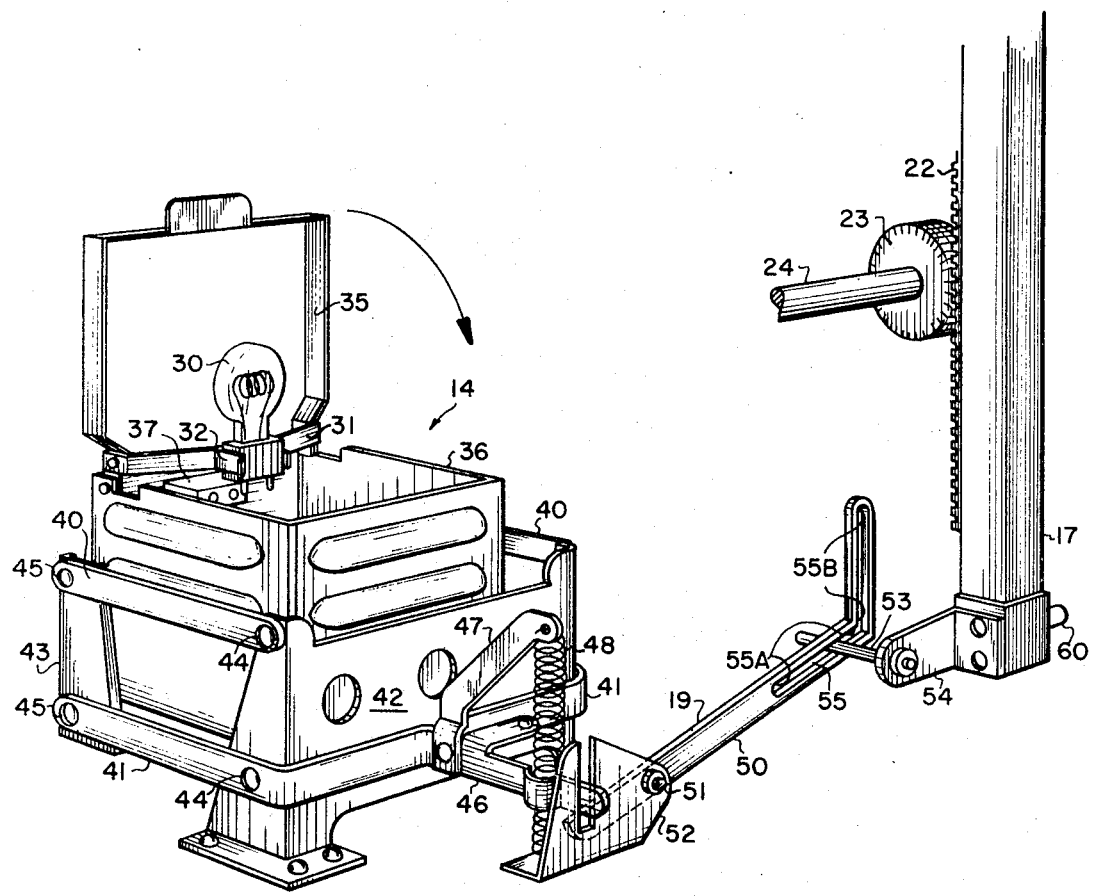
FIG. 2 is an enlarged, fragmentary isometric view of the lamp holder and housing assembly, the lower end of the projection head post, and the connecting cam linkages between these two components of the projector shown in FIG. 1.

For purposes of describing the overall operative relationship of the major components of the projector, reference is made to FIG. 1. Details of these components are illustrated in the other figures and will be described after the preliminary description of the entire apparatus which now follows. Referring to FIG. 1, the projector body comprises a generally cubical case 10 and top assembly 11. Pivotally connected by hinges to one side of top assembly 11 is the projection stage assembly 12 which houses the transparency stage 13 and the condensing lens, which may be a conventional plastic Fresnel lens (not shown). Inside case 10 is the lamp housing assembly 14. When on-off switch 15 is turned on, the lamp and condensing lens projects an upwardly directed cone of light through the transparency stage 13 to the projection head 16 which reflects and focuses the image of a transparency positioned on stage 13 onto a screen. The projection head 16 is repositioned vertically with its mounting post 17 for focusing of the image by turning focusing knob 18. As the head 16 carried by post 17 is repositioned, lamp housing assembly 14 is simultaneously repositioned by the lamp elevation cam assembly 19 in order to maintain the proper conjugate distances between the lamp and the condensing lens on the one hand, and the distance between the condensing lens and head 16 on the other, which distances are predetermined for each projection distance so as to maintain the optimum location of the lamp filament image relative to the projection head 16.

Figure 6:
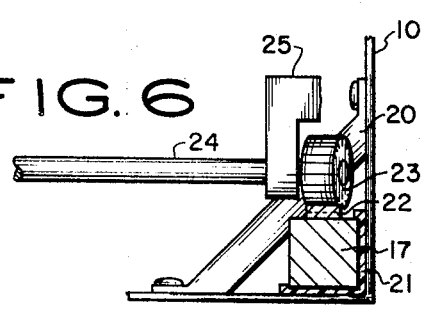
FIG. 6 is a detail view of the projection post mounting and focusing assembly of the projector shown in FIG. 1.

Referring now to FIGS. 1, 2 and 6 for the details of the projection head focusing arrangement, post 17 is movably mounted in a corner of case 10 between brackets 20 (one of which is shown in FIGS. 1 and 6) and a right-angle guide 21, all of which elements are preferably made of a relatively rigid, low friction plastic such as Delrin. Brackets 20 are attached to the adjacent side of case 10 in a conventional way, such as by screws, so as to hold post 17 against guide 21, thus aligning post 17 while permitting it to slide vertically in order to reposition projection head 16. Attached to one side of post 17 is rack 22 which is engaged by pinion gear 23. Gear 23 is mounted on shaft 24, which is suitably journalled as by bearring 25 connected to the projector top assembly 11, and which is connected to and turned by focusing knobs 18. It should be noted that knob 18 is lower than pinion gear 23 resulting in an upward slope of shaft 24 from knob 18 to gear 23. The reason for this is to permit the fore and aft mounting of transparency roll attachments as described above. Knob 18 is positioned at the front of the projector and just below the transparency stage 13 in order to facilitate convenient operation of the projector by the user. Because of the slope of shaft 24, the teeth of gear 23 are cut on a helix in order to properly engage the horizontal teeth of rack 22.

Thus, as focusing knob 18 is turned, this turns shaft 24 and pinion gear 23 so as to raise or lower post 17 and projection head 16. Focusing of the projected image is accomplished in this manner.

Figure 3:
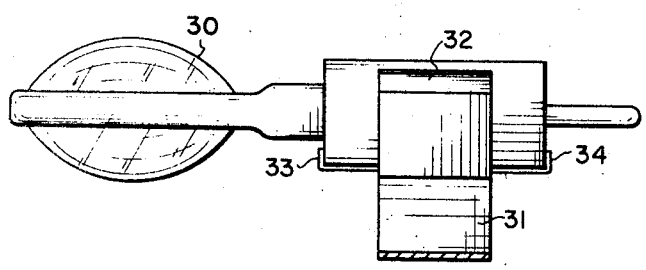
FIG. 3 is a detail view of the lamp and lamp holder of the lamp housing shown in FIG. 2.

Referring now to FIGS. 1, 2 and 3 for the details of the lamp housing assembly 14 and lamp elevation assembly 19, lamp 30 is held in a hinged yoke 31 by means of two side fingers 32, a front clamping flange 33 and a rear clamping flange 34. Yoke 31 is provided with a handle 35 which pivotally connects yoke 31 to lamp housing 36. FIG. 2 shows the handle 35 in its upward position, with the lamp 30 in convenient position for removal and replacement. By swinging yoke 31 downward, lamp 30 is mechanically transported and automatically inserted into lamp socket 37. Rear clamp flange 34 forces lamp 30 into the fully engaged position in socket 37. When lamp 30 burns out and requires replacement, it may be automatically removed from socket 37 and brought upwardly to a convenient position away from the heated lamp housing 36 by simply grasping handle 35 and swinging handle 35 and yoke 31 upwardly. This swings the burned out lamp 30 up and away from the hot lamp housing 36 to a position where it can be easily removed and replaced. The force for removal of lamp 30 from socket 37 is applied by handle 35 through rear clamping flange 34. Thus this lamp holder arrangement greatly simplifies the insertion and removal of the lamp 30 and protects the operator from those portions of the lamp 30 and lamp housing 36 which become extremely hot in operation.

The entire lamp housing 36 (including lamp 30) is movably supported on pairs of parallel arms 40 and 41, a pair of each being positioned on each side of housing 36. Each pair of arms 40 and 41 pivot at their front ends about stationary support bracket 42 (pivot points 44) which is fixed to the base of the projector body in any suitable manner such as by screws. Parallel arms 40 and 41 are likewise pivoted at their back ends about movable bracket 43 (pivot points 45) on which is mounted housing 36 and lamp 30 within the housing. Thus as pivot arms 40 and 41 swing upwardly about pivot points 44, they raise lamp housing 36 and lamp 30 within the housing by raising bracket 43 on which the lamp housing 36 is mounted.

Arms 41 extend around and outwardly from housing 36 forming a yoke with an actuating arm 46. Attached to arm 46 through bracket 47 is a tension spring 48 which tends to pull arm 46 in a downward direction toward the base of the projector to which spring 48 is attached in a usual way. Counteracting the force of spring 48 on arm 46 is the lower end of cam lever 50 which is pivotally supported about pivot point 51 on bracket 52 which is connected to the base of the projector by any suitable means such as by screws.

As pointed out above, the image of the transparency is focused on the screen by repositioning the head 16 relative to the transparency stage 13, and lamp 30 should be repositioned each time the projection head 16 is repositioned in order to maintain the optimum position of the lamp filament image in the projection head 16. The structure for accomplishing this operates in the following way.

Pin 53, which is mounted on bracket 54 and thus moves with post 17, engages slot 55 of the cam lever 50. Slot 55 has a diagonal portion 55A and a generally vertical portion 55B. As projection head 16 and post 17 are raised to focus the image (when pin 53 is in cam slot portion 55B) pin 53 moves lever 50 in a counterclockwise direction (FIG. 2) and thereby allows spring 47 to pull actuating arm 46 down, thus moving lamp housing 36 up. The precise amount of upward movement of lamp 30 and lamp housing 36 which is required for optimum positioning of lamp 30 is precomputed and can be obtained by appropriate spacing, positioning, and proportioning of the various linkage elements in this lamp elevation cam assembly. In like manner lamp 30 and housing 36 move down with head 16 through the same linkage arrangement.

It will be apparent that lamp 30 moves on a slight arc in its up and down traverse, since it moves on the radii of arms 40 and 41. The effect of the resulting very slight lateral shift of lamp 30 is minimized by positioning lamp 30 when it is at its lowest position inside the vertical tangent of the arc of movement of lamp 30, passing lamp 30 outwardly through this tangent at the midpoint of the vertical traverse of lamp 30, and then returning inwardly away from the tangent at the highest point of the lamp traverse.

It should also be apparent that in a simplified, less expensive version, the lamp elevation mechanism need not be operatively connected to the projection head elevation arrangement. A separate manually operated lamp elevation system would operate satisfactorily.

Cam slot 55 also has a vertical portion 55B in which pin 53 can move upwardly without affecting the position of lever 50 and housing 36. The point where slot 55A meets slot 55B defines the limit of the upward travel of housing 36. Raising pin 53 (and head 16 and post 17) beyond this point does not affect focusing, but rather performs another function, namely unlocking and opening the projector top assembly in a manner which will now be described.

Figure 4:
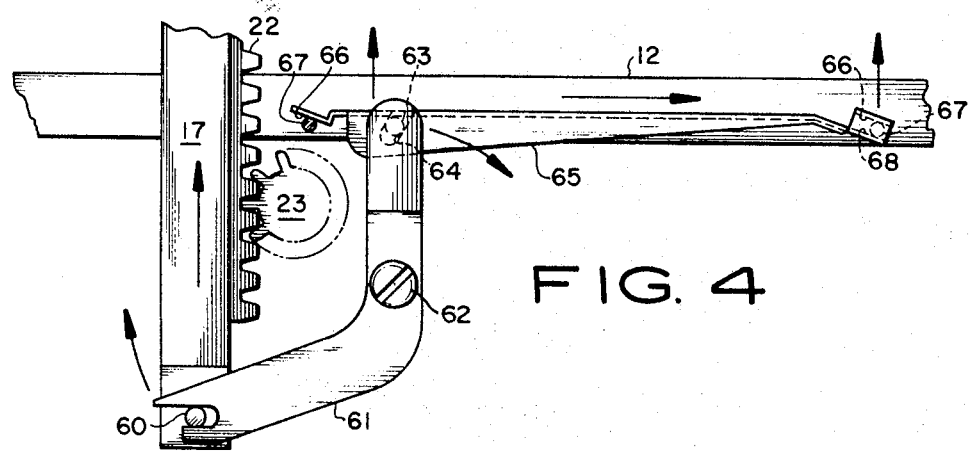
FIG. 4 is a fragmentary elevation of the projector top latch assembly, lower end of the projection head post, and the cam lever linkage between these two components of the projector shown in FIG. 1.
Figure 5:
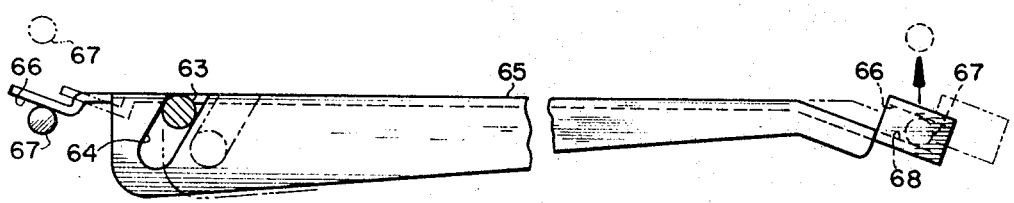
FIG. 5 is a detail view of the projector latch assembly of FIG. 4, showing the open and closed position of the latch.

Referring to FIG. 2, attached to projection post bracket 54 on the lower end of post 17 is a cover lock actuating pin 60. Referring now to FIG. 4, pin 60 is shown engaging latch actuating crank 61, which is pivotally supported from the top assembly (see FIG. 1) of the projector body about pivot point 62. The upper end of crank 61 has a pin 63 which engages slot 64 of latch bar 65. Bar 65 is slidably connected to the projector top assembly (see FIG. 1) in a conventional manner (as for example by two aligned screws and corresponding elongated slots). Latch bar 65 may thus be shifted toward the right (see FIG. 4) by the clockwise movement of crank 61 under the force exerted by crank pin 60 in response to the movement of projection head post 17.

Latch bar 65 has a pair of locking ramps 66 which are integral with bar 65 and which lock the projection stage assembly 12 to the projector top assembly 11 by means of pins 67 which are integral with projection stage assembly 12. Movement of latch bar 65 toward the left (FIG. 4), as by downward movement of port 17, causes locking ramps 66 to engage and push downwardly pins 67, and thus pull down the projection stage assembly 12 into a closed locked position. When latch bar 65 is shifted toward the right (as by raising post 17), latch bar 65 disengages the locking ramps 66 from the pins 67, and thereby unlocks the projection stage assembly 12 from the projector top assembly 11. Also on one end of latch bar 65 there is included adjacent one locking ramp 66 a longer unlocking ramp 68, which extends to the left (FIG. 4) of the adjacent locking ramp 66. It will be apparent that as latch bar 65 is shifted to the right by the upward movement of pin 60, locking ramps 66 also move to the right and thereby release projection stage assembly 12, and further that the continued movement of bar 65 toward the right pushes the unlocking ramp 68 against the adjacent pin 67 so as to push the projection stage upwardly and thereby slightly open the projection stage an amount sufficient to permit an operator to easily grasp the projection stage assembly 12 and fully open it.

Thus if an operator wishes to open the projector body, for example in order to replace a burned out lamp or to dust off the condensing lenses, the operator turns the focusing knob 18 to raise post 17 and attached pin 60 upwardly until pin 60 engages and turns crank 61 in a clockwise direction (FIG. 4) so as to shift latch bar 65 toward the right and unlock the locking ramps 66. Continued turning of focusing knob 18 engages the unlocking ramp 67 and thus raises the projection stage assembly 12 slightly above the projector top assembly 11 to facilitate easy opening by the operator. Not only does this arrangement facilitate easy opening of the projection; it also prevents raising of the projection stage assembly 12 to its fully opened position until head 16 is clear of obstructing it.

It should also be noted at this point that the projection stage assembly 12 may comprise separately hinged elements for mounting the transparency stage and the Fresnel lens. By separately hinging these two elements, all surfaces of the projection stage 13 and the condensing lens become readily accessible for cleaning.

Figure 7:
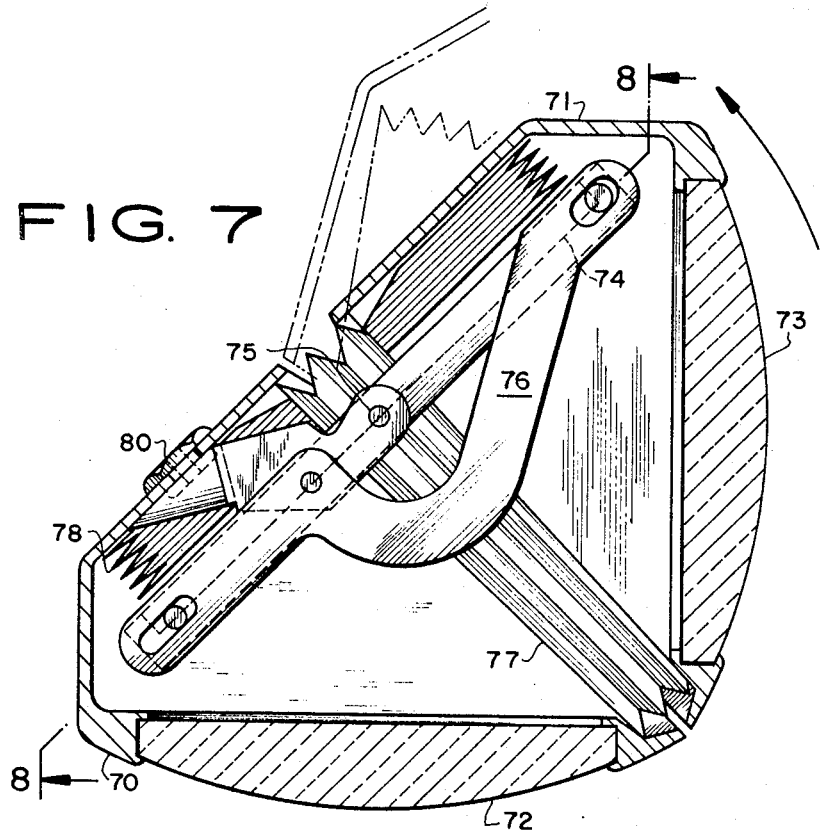
FIG. 7 is a fragmentary cross-sectional view of the projection head of the projector shown in FIG. 1.
Figure 8:
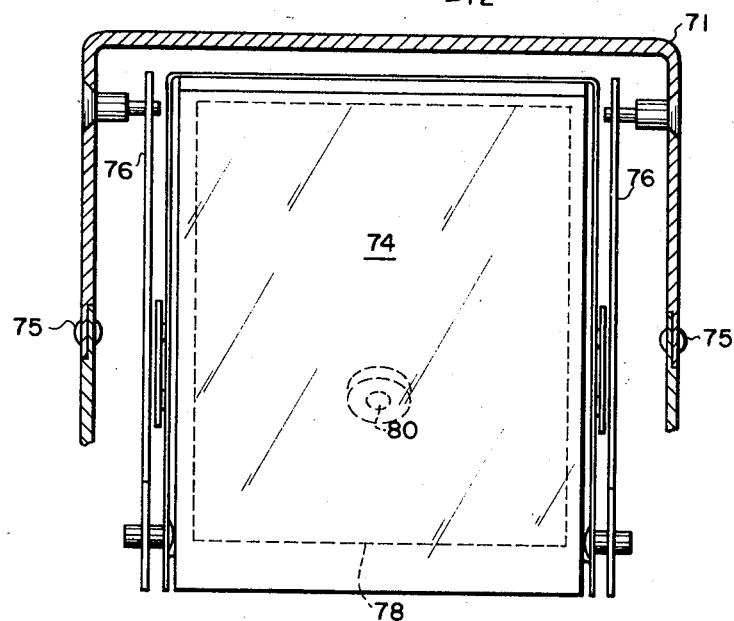
FIG. 8 is a cross-sectional view of the head shown in FIG. 7, taken on section lines 8—8 thereof.

Referring now to FIGS. 7 and 8 for the details of the projection head 16, the head comprises two lens housings 70 and 71 in which are mounted lenses 72 and 73, respectively. Diagonally disposed between and on the optical axes of lenses 72 and 73 is mirror 74. Housings 70 and 71 and mirror 74 are pivotally connected together about pivot points 75 by linkage 76. Linkage 76 permits elevation of the image by pivoting lens 73 to the given angle of desired elevation, causing mirror 74 to pivot through half this angle by means of linkage 76, thus keeping the projected image coaxially aligned to lenses 72 and 73 through the range of elevation of the projection head, as described above. An airtight bellows 77 connects the two lens housings 70 and 71 of the head 16 to prevent the entrance of dirt or dust. It can readily be appreciated that when lens housing 70 is raised, there is an increase in volume contained within the projection head 16. To compensate for this change of volume, there is provided a self compensating lung or chamber 78 positioned behind mirror 74. Lung 78 contains an outlet 80 communicating with the outside air. Thus as housing 70 is pivoted upwardly from housing 71, the apparent volume of projection head 16 increases; however, lung 78 expands to compensate for this increase in volume by permitting air to enter through opening 80 into lung 78, thus expanding it. Since lung 78 is positioned behind mirror 74, it does not obstruct the image projected through head 16. In effect, the two lens housings 70 and 71, bellows 77 and lung 78 define a sealed dust-free air chamber, and lung 78 expands or contracts to compensate against any change of volume within that chamber which might cause the bellows 77 to burst or collapse and to push or pull the two housings relative to each other when the relative positions of the two housings are changed.

Alternatively lung 78 can be eliminated if a dust filter is inserted at opening 80. Such a dust filter would allow outside air to enter head 16 but would remove the objectionable dust by conventional filtration. This filter could then be periodically replaced or cleaned as operation required.

The above is a description of one embodiment of the invention. Those skilled in the art will be able to make various changes and modifications in it without thereby departing from the scope and spirit of the invention.

We claim:
1. An overhead projector comprising:
  (a) a projector body having a front, back, sides and a base,
  (b) a lamp movably positioned in said body,
  (c) a projection stage assembly closing the top of said body and adapted to support a transparency for projection,
  (d) a projection head above the body adapted to project the image of the transparency onto a screen for viewing,
  (e) a post fixedly holding the head for such projection, said post extending upwardly from the body and being movably mounted to the body for adjustably supporting the head on a vertical axis above the body for such projection,
  (f) focusing means for vertically repositioning the post and thereby the projection head relative to the body whereby the transparency image may be focused for different projection distances,
  (g) lamp elevation means for vertically repositioning said lamp relative to the body, and
  (h) linkage means connecting said focusing means and lamp elevation means, said linkage means adapted to reposition the lamp in response to and in the same direction as the movement of said post, the relative movement of the lamp and post being predetermined to maintain a desired position of the filament image of the lamp relative to the projection head,
    wherein said lamp elevating means comprises a lamp housing, movable bracket means pivotally connected to said housing, stationary bracket means mounted to the base of the projector body, and a plurality of parallel arms pivotally connecting said movable and stationary bracket means to form a parallel motion linkage.

2. An overhead projector as claimed in claim 1 further comprising a lamp holder for positioning the lamp in the lamp housing, said holder comprising a yoke pivoted to the housing, a pair of spring fingers connected to said yoke and adapted to engage the sides of the lamp base for laterally positioning the lamp relative to the yoke, and front and rear flanges connected to the yoke and adapted to engage the front and rear faces of the lamp base for transmitting force from the yoke to the lamp for inserting and removing the lamp from its socket in the lamp housing.

3. An overhead projector as claimed in claim 1 wherein said linkage means comprises a lever pivotally supported from the projector body having a cam engaging surface on one end of the lever, means connected to the lower end of the post and engaging said cam surface for pivoting said lever in response to the movement of said post, means connecting the other end of said lever to the parallel arms of the lamp housing, whereby movement of the post pivots the lever and thus pivots the parallel arms, causing the lamp and lamp housing to move in the aforesaid manner.

4. An overhead projector comprising:
  (a) a projector body having a front, back, sides and a base,
  (b) a lamp movably positioned in said body,
  (c) a projection stage assembly closing the top of said body and adapted to support a transparency for projection, (d) a projection head above the body adapted to project the image of the transparency onto a screen for viewing,
(e) a post fixedly holding the head for such projection, said post extending upwardly from the body and being movably mounted to the body for adjustably supporting the head on a vertical axis above the body for such projection,
(f) focusing means for vertically respositioning the post and thereby the projection head relative to the body whereby the transparency image may be focused for different projection distances,
(g) lamp elevation means for vertically repositioning said lamp relative to the body,
(h) linkage means connecting said focusing means and lamp elevation means, said linkage means adapted to reposition the lamp in response to and in the same direction as the movement of said post, the relative movement of the lamp and post being predetermined to maintain a desired position of the filament image of the lamp relative to the projection head, and
means for closing and opening said projection stage assembly, said means comprising means for pivotally connecting the projection stage assembly to the projector body, an extension protruding from the projection stage assembly, a latch bar movably mounted to the projector body between an open and closed position, said latch bar having an opening ramp and a closing ramp positioned to engage said extension alternately when such bar is in the open and closed position respectively, said closing ramp being adapted to engage, close and latch said extension and projection stage assembly when the latch bar is moved to its closed position, and to unlatch and disengage therefrom when the bar is moved to its open position, said opening ramp being adapted to engage and open said extension and projection stage assembly when the latch bar is moved to its open position, and linkage means connecting the latch bar and said post and adapted to move the latch bar to its open or closed position in response to the position of the post, the position of the post corresponding to the closed position being within the normal focusing range movement of the post and the position of the post corresponding to the open position being outside that range.

5. An overhead projector comprising:
(a) a projector body having a front, back, sides and a base,
(b) a lamp movably positioned in said body,
(c) a projection stage assembly closing the top of said body and adapted to support a transparency for projection,
(d) a projection head above the body adapted to project the image of the transparency onto a screen for viewing,
(e) a post fixedly holding the head for such projection, said post extending upwardly from the body and being movably mounted to the body for adjustably supporting the head on a vertical axis above the body for such projection,
(f) focusing means for vertically repositioning the post and thereby the projection head relative to the body whereby the transparency image may be focused for different projection distances,
(g) lamp elevation means for vertically repositioning said lamp relative to the body, and (h) linkage means connecting said focusing means and lamp elevation means, said linkage means adapted to reposition the lamp in response to and in the same direction as the movement of said post, the relative movement of the lamp and post being predetermined to maintain a desired position of the filament image of the lamp relative to the projection head,
wherein said projection head comprises a first optical element housing, a second optical element housing, means pivotally connecting said first and second optical element housings, collipsible means sealably connecting said housings in an air-tight manner, and volume change compensating means for admitting and discharging dust-laden air to and from said sealed housings without permitting the dust from such air to contact the optical refracting and reflecting surfaces in said head.

6. An overhead projector as claimed in claim 5 wherein said volume change compensating means comprises an outside opening with a dust filter in one of said housings, 7. An overhead projector as claimed in claim 5 wherein said volume change compensating means comprises an outside opening in one of said housings and an air-tight collapsible chamber connected to and communicating with said opening and positioned inside said housings outside the path of light which is to be projected through the head.

8. An improved overhead projector of the type including a projector body, a lamp inside the body for illuminating the projectable material, and a projection head above and substantially in line with the lamp; wherein the improvement consists essentially of:
(a) means including a parallel linkage mechanism for movably mounting the lamp for vertical adjustment within the projector body,
(b) a post fixedly holding the projection head, said post extending upwardly from the projector body and being movably mounted to the body for adjustably supporting the head on a vertical axis above the body for such projection,
(c) drive means for vertically repositioning said post and head as a unit to focus the projected image,
(d) linkage means connecting the lamp mounting means with the post support for vertically adjusting the lamp in response to vertical repositioning of the post and head, said lamp position being adjusted to maintain a predetermined lamp filament image position within the head as the post and head is vertically repositioned.

9. In a projector of the type claimed in claim 8, said projector having a front side disposed toward the direction of projection and an opposite rear side, and wherein the post is mounted adjacent the rear side of the projector, said drive means comprising,
(a) a rack mounted on the post,
(b) a pinion gear engaged to the rack, and
(c) manually operated means connected to said pinion gear extending through the interior and front side of the projector body for turning the pinion gear.

References Cited
UNITED STATES PATENTS 3,124,035  3/1964  Lucas _____ 353—82
3,244,069  4/1966  Field _____ 353—87

HARRY N. HAROIAN, Primary Examiner